(12) United States Patent
Santry et al.

(10) Patent No.: US 7,152,069 B1
(45) Date of Patent: Dec. 19, 2006

(54) ZERO COPY WRITES THROUGH USE OF MBUFS

(75) Inventors: Douglas J. Santry, San Francisco, CA (US); Robert M. English, Menlo Park, CA (US)

(73) Assignee: Network Appliance, Inc., Sunnyvale, CA (US)

(*) Notice: Subject to any disclaimer, the term of this patent is extended or adjusted under 35 U.S.C. 154(b) by 608 days.

(21) Appl. No.: 10/271,633

(22) Filed: Oct. 15, 2002

(51) Int. Cl.
*G06F 17/30* (2006.01)

(52) U.S. Cl. ........................ 707/100; 707/200
(58) Field of Classification Search ............... 707/100, 707/1, 200–201; 711/129, 1
See application file for complete search history.

(56) References Cited

U.S. PATENT DOCUMENTS

| | | | |
|---|---|---|---|
| 4,780,808 A * | 10/1988 | Moreno et al. ............... 711/4 |
| 5,819,292 A | 10/1998 | Hitz et al. | |
| 5,860,149 A * | 1/1999 | Fiacco et al. ............... 711/209 |
| 5,931,918 A * | 8/1999 | Row et al. ................. 719/321 |
| 5,963,962 A | 10/1999 | Hitz et al. | |
| 6,038,570 A | 3/2000 | Hitz et al. | |
| 6,154,813 A * | 11/2000 | Martin et al. ............... 711/133 |
| 6,389,513 B1 * | 5/2002 | Closson ..................... 711/129 |
| 6,434,620 B1 * | 8/2002 | Boucher et al. ............ 709/230 |
| 6,820,183 B1 * | 11/2004 | Haggar et al. ............. 711/170 |

OTHER PUBLICATIONS

David Hitz et al. TR3002 File System Design for a NFS File Server Appliance published by Network Appliance, Inc., Jul. 9, 2001.

Common Internet File System (CIFS) Version: CIFS-Spec 0.9, Storage Networking Industry Association (SNIA), Draft SNIA CIFS Documentation Work Group Work-in-Progress, Revision Date: Mar. 26, 2001.

Fielding et al. (1999) Request for Comments (RFC) 2616, HTTP/1.1, Jun. 3, 2002.

Wright et al., TCP/IP Illustrated, vol. 2, Chapter 2: MBUFS: Memory Buffers, pp. 31-61.

* cited by examiner

*Primary Examiner*—Greta Robinson
*Assistant Examiner*—Cheryl Lewis
(74) *Attorney, Agent, or Firm*—Cesari and McKenna, LLP

(57) ABSTRACT

A system and method enable a storage operating system to partition data into fixed sized data blocks that can be written to disk without having to copy the contents of memory buffers (mbufs). The storage operating system receives data from a network and stores the data in chains of mbufs having various lengths. However, the operating system implements a file system that manipulates data in fixed sized data blocks. Therefore, a set of buffer pointers is generated by the file system to define a fixed sized block of data stored in the mbufs. The set of buffer pointers address various portions of data stored in one or more mbufs, and the union of the data portions form a single fixed sized data block. A buffer header stores the set of pointers associated with a given data block, and the buffer header is passed among different layers in the storage operating system. Thus, received data is partitioned into one or more fixed sized data blocks each defined by a set of buffer pointers stored in a corresponding buffer header. Because the buffer pointers address data directly in one or more mbufs, the file system does not need to copy data out of the mbufs when partitioning the data into fixed sized data blocks.

39 Claims, 11 Drawing Sheets

ZERO COPY WRITES THROUGH USE OF MBUFS

FIELD OF INVENTION

The present invention relates to file systems and, more specifically, to a technique for writing files within a file system onto a storage medium.

BACKGROUND INFORMATION

A file server is a computer that provides file service relating to the organization of information on storage devices, such as disks. The file server or filer may be embodied on a storage system including a storage operating system that implements a file system to logically organize the information as a hierarchical structure of directories and files on the disks. Each "on-disk" file may be implemented as a set of disk blocks configured to store information, such as text, whereas the directory may be implemented as a specially-formatted file in which information about other files and directories are stored.

A filer may be configured to operate according to a client/server model of information delivery to thereby allow many clients to access files stored on a server, e.g., the filer. In this model, the client may comprise an application, such as a file system protocol, executing on a computer that "connects" to the filer over a computer network, such as a point-to-point link, shared local area network (LAN), wide area network (WAN), or virtual private network (VPN) implemented over a public network such as the Internet. Each client may request the services of the filer by issuing file system protocol messages, usually in the form of packets, to the filer over the network.

As used herein, the term storage operating system generally refers to the computer-executable code operable on a storage system that manages data access and client access requests and may implement file system semantics in implementations involving filers. In this sense, the Data ONTAP™ storage operating system, available from Network Appliance, Inc. of Sunnyvale, Calif., which implements a Write Anywhere File Layout (WAFL™) file system, is an example of such a storage operating system implemented as a microkernel within an overall protocol stack and associated disk storage. The storage operating system can also be implemented as an application program operating over a general-purpose operating system, such as UNIX® or Windows NT®, or as a general-purpose operating system with configurable functionality, which is configured for storage applications as described herein.

The disk storage is typically implemented as one or more storage volumes that comprise physical storage disks, defining an overall logical arrangement of storage space. Currently available filer implementations can serve a large number of discrete volumes (150 or more, for example). Each volume is associated with its own file system and, for purposes hereof, volume and file system shall generally be used synonymously. The disks within a volume are typically organized as one or more groups of Redundant Array of Independent Disks (RAID). RAID implementations enhance the reliability/integrity of data storage through the redundant writing of data "stripes" across a given number of physical disks in the RAID group, and the appropriate storing of parity information with respect to the striped data. As described herein, a volume typically comprises at least one data disk and one associated parity disk (or possibly data/ parity partitions in a single disk) arranged according to a RAID 4, or equivalent high-reliability, implementation.

Packets of information received by a filer from a network interface are typically stored in a memory buffer data structure or mbuf in the memory of a filer. Mbufs are used to organize received information into a standardized format that can be manipulated by various layers of a network protocol stack within a storage operating system. The information stored in a mbuf can include a variety of different data types including, inter alia, source and destination addresses, socket options, user data and file access requests. Further, mbufs can be used as elements of larger data structures, e.g. linked lists, and are particularly useful in dynamically changing structures since they can be created or removed "on the fly." A description of mbuf data structures is provided in *TCP/IP Illustrated*, Volume 2 by Wright et al (1995) which is incorporated herein by reference.

Information is often received from a network as data packets of various lengths and these packets are stored in variable length chains of mbufs. In contrast, file systems usually operate on data arranged in blocks of a predetermined size. For instance, data in the WAFL file system is stored in contiguous 4 kilobyte (kB) blocks. Therefore, data received by a filer is converted from variable length mbufs to the fixed sized blocks for use by the file system. The process of converting data stored in mbufs to fixed sized blocks may involve copying the contents of the mbufs into the filer's memory, then having the file system reorganize the data into blocks of a predetermined size.

File systems typically associate a buffer header with each fixed sized data block. Information in a buffer header may include a pointer for locating the data block at a particular location in memory, a block number for identifying the data block from among other blocks at that memory location, a file name associated with data in the data block, and so forth. Because they are generally much smaller in size than their associated data blocks, buffer headers are often "passed" between layers of the storage operating system instead of their larger data blocks. That is, the operating system layers (e.g., network protocol stack, file system and disk access layers) operate only on the contents of the buffer headers to resolve file access requests. Therefore, once data received by a filer is copied from mbufs into memory and partitioned into fixed block sizes, buffer headers for the fixed sized data blocks can be sent to a RAID layer and a disk device driver layer of the storage operating system in accordance with a resolved file access request.

The process of converting data from variable length mbuf data structures to fixed sized blocks consumes system resources, such as memory and central processing unit (CPU) cycles, that could be used for other operations executed by the filer. Furthermore, the latency resulting from this conversion becomes particularly noticeable when a large number of mbuf data structures are converted to fixed sized data blocks. For example, when a filer receives a request to store (via a "WRITE" operation) a large file to disk, its file system must allocate a sufficient amount of memory for mbufs to receive the in-coming file and, in addition, must allocate more memory to copy the contents of the mbufs when the received file is divided into fixed block sizes. Not only does such a WRITE operation consume a lot of memory, but it also requires the filer's CPU to implement instructions for moving and partitioning the data file thereby consuming CPU cache and bandwidth that could be used by other processes.

Therefore, it is generally desirable to decrease the latency of processing in-coming data to a filer by decreasing the number of times mbufs are copied and partitioned in the filer's memory. More specifically, it is desirable to minimize the amount of time and system resources needed to write large data files to one or more storage disks in a filer without affecting the resolution of other file access requests, such as file "READ" requests.

SUMMARY OF THE INVENTION

The present invention provides a technique for a storage operating system to partition data into fixed sized data blocks without having to copy the contents of the memory buffers (mbufs) in which they were received. A storage operating system according to the present invention can directly handle data received in mbufs and, consequently, does not consume time and system resources copying and partitioning the mbuf contents. In an illustrative embodiment, a "write path" of the storage operating system is modified to handle mbuf data structures whereas other file access request paths, such as a "read path," remain unaltered. As used herein, the write path defines the code used by the storage operating system to process file WRITE requests, and the read path defines the code used by the storage operating system to process file READ requests.

Further to the illustrative embodiment, a request to WRITE user data to a storage medium is received at a filer. The filer's storage operating system places the received data in one or more mbuf data structures which may be of varying sizes. Because the filer received a WRITE request, the received data is partitioned into one or more fixed sized data blocks, e.g. 4 kilobytes, in accordance with the configuration of a file system implemented by the storage operating system. Advantageously, the operating system of the present invention partitions the received data without having to copy the contents of the mbufs. The file system layer of the storage operating system generates sets of one or more buffer pointers to define the fixed sized blocks. Each set of buffer pointers addresses various portions of the received data stored in one or more of the mbufs, and the union of these data portions form a single fixed sized data block.

A buffer header is used to store the set of buffer pointers associated with a given data block, and the buffer header can be passed among different layers in the storage operating system. Thus, received data may be partitioned into one or more fixed sized data blocks each defined by a set of buffer pointers stored in a corresponding buffer header. Further, the buffer headers may comprise additional information, such as block numbers or identification data. When RAID implementations are used, the file system passes the buffer headers to a RAID layer of the storage operating system. The RAID layer can use the set of pointers in each buffer header to calculate a parity value for each fixed sized data block. A disk driver layer of the operating system receives the buffer headers from the RAID layer, along with any parity values that may have been computed, and can use a scatter/gather method to convert the sets of buffer pointers to contiguous fixed sized data blocks that are written to the storage medium.

Although an embodiment is considered for modifying the write path independently of other file access resolutions, such as the read path, it is expressly contemplated that the sets of buffer pointers, as described herein, may be used to partition data received in mbufs for any file access request that requires a storage operating system to manipulate data in blocks having predetermined sizes, e.g., a fixed block size. Further, when a buffer header of the present invention is accessed by procedures not in the write path, the storage operating system may convert the set of buffer pointers within the buffer header to a fixed sized data block that may be manipulated by the procedures.

The present invention also implements a modified mbuf that allows a storage operating system to recycle a mbuf data structure when there are no buffer pointers referencing its data. Specifically, the modified mbuf comprises a pointer reference count that keeps track of the number of buffer pointers addressing data portions in a mbuf data structure. Advantageously, a file system can minimize system memory usage by de-allocating mbuf data structures having a pointer reference count equal to zero. The de-allocated data structures may then be added to a list (or "pool") of "free" mbufs that later may be allocated to store in-coming network packets.

BRIEF DESCRIPTION OF THE DRAWINGS

The above and further advantages of the invention may be better understood by referring to the following description in conjunction with the accompanying drawings in which like reference numerals indicate identically or functionally similar elements, of which.

DETAILED DESCRIPTION OF AN ILLUSTRATIVE EMBODIMENT

A. Storage System Environment

Figure 1:
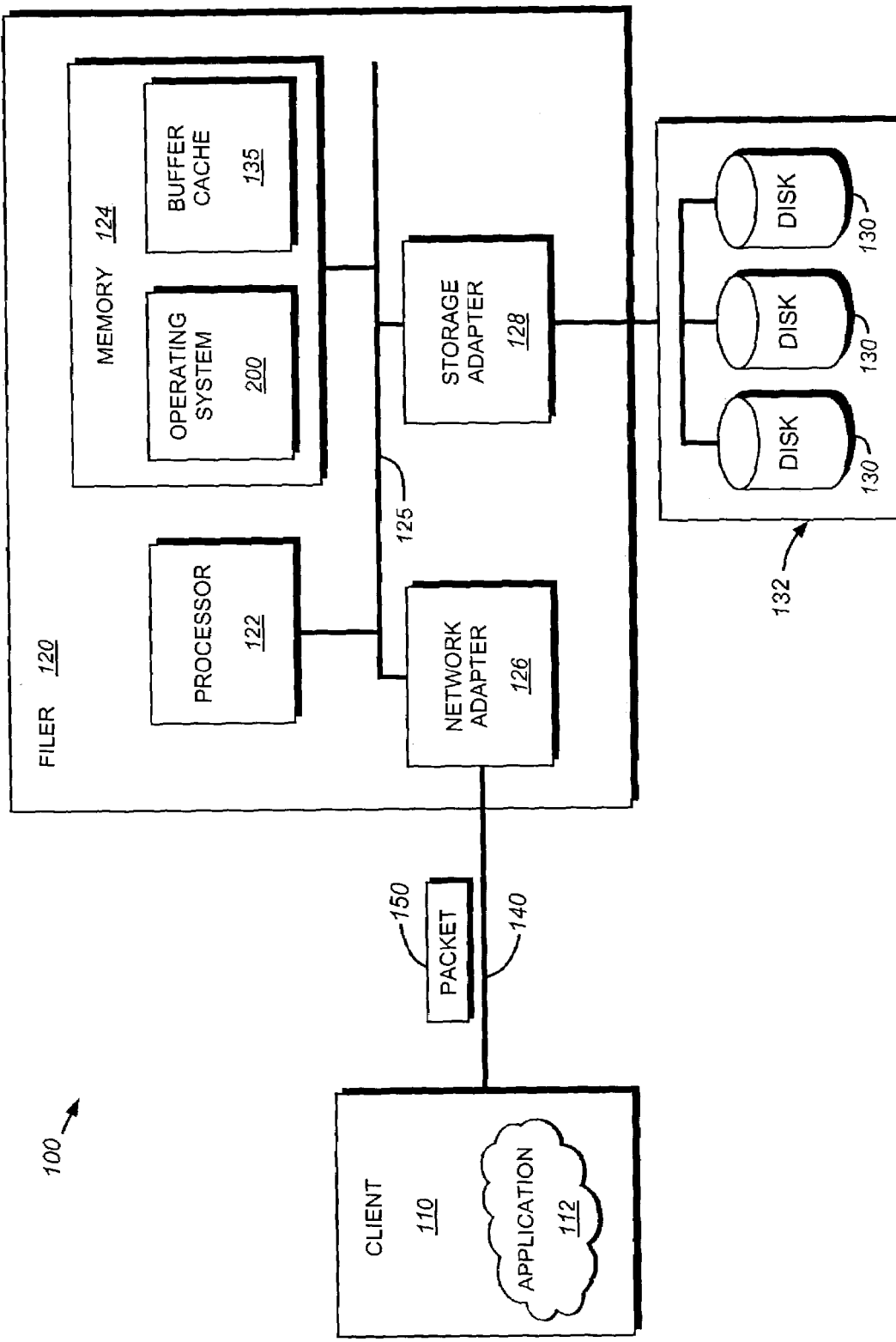
FIG. 1 is a schematic block diagram of a storage system environment including a file server.

FIG. 1 is a schematic block diagram of a storage system environment 100 that includes a client 110 having one or more applications 112, and an interconnected file server 120 that may be advantageously used with the present invention. The filer server or "filer" 120 is a computer that provides file service relating to the organization of information on storage devices, such as disks 130. It will be understood to those skilled in the art that the inventive technique described herein may apply to any type of special-purpose computer (e.g., server) or general-purpose computer, including a standalone computer. The filer 120 comprises a processor 122, a memory 124, a network adapter 126 and a storage adapter 128 interconnected by a system bus 125. The filer 120 also includes a storage operating system 200 that implements a file system to logically organize the information as a hierarchical structure of directories and files on the disks.

It will be understood to those skilled in the art that the inventive technique described herein may apply to any type of special-purpose computer (e.g., file serving appliance) or general-purpose computer, including a standalone computer, embodied as a storage system. To that end, filer 120 can be broadly, and alternatively, referred to as storage system. Moreover, the teachings of this invention can be adapted to a variety of storage system architectures including, but not limited to, a network-attached storage environment, a storage area network and disk assembly directly-attached to a client/host computer. The term "storage system" should, therefore, be taken broadly to include such arrangements.

In the illustrative embodiment, the memory 124 comprises storage locations that are addressable by the processor and adapters for storing software program code. A portion of the memory may be further organized as a "buffer cache" 135 for storing data structures that are passed between disks and the network during normal runtime operation. The memory comprises a form of random access memory (RAM) that is generally cleared by a power cycle or other reboot operation (e.g., it is a "volatile" memory). The processor and adapters may, in turn, comprise processing elements and/or logic circuitry configured to execute the software code and manipulate the data structures. The operating system 200, portions of which are typically resident in memory and executed by the processing elements, functionally organizes the filer by, inter alia, invoking storage operations in support of a file service implemented by the filer. It will be apparent to those skilled in the art that other processing and memory means, including various computer readable media, may be used for storing and executing program instructions pertaining to the inventive technique described herein.

The network adapter 126 comprises the mechanical, electrical and signaling circuitry needed to connect the filer 120 to a client 110 over a computer network 140, which may comprise a point-to-point connection or a shared medium, such as a local area network. The client 110 may be a general-purpose computer configured to execute applications 112, such as a file system protocol. Moreover, the client 110 may interact with the filer 120 in accordance with a client/server model of information delivery. That is, the client may request the services of the filer, and the filer may return the results of the services requested by the client, by exchanging packets 150 encapsulating, e.g., the Common Internet File System (CIFS) protocol or Network File System (NFS) protocol format over the network 140.

The storage adapter 128 cooperates with the operating system 200 executing on the filer to access information requested by the client. The information may be stored on the disks 130 of a disk shelf 132 that is attached, via the storage adapter 128, to the filer 120 or other node of a storage system as defined herein. The storage adapter 128 includes input/output (I/O) interface circuitry that couples to the disks over an I/O interconnect arrangement, such as a conventional high-performance, Fibre Channel serial link topology. The information is retrieved by the storage adapter and, if necessary, processed by the processor 122 (or the adapter 128 itself) prior to being forwarded over the system bus 125 to the network adapter 126, where the information is formatted into a packet and returned to the client 110.

In an illustrative embodiment, the disk shelf 132 is arranged as a plurality of separate disks 130. The disk shelf 132 may include, in some embodiments, dual connectors for redundant data paths. The disks 130 are arranged into a plurality of volumes, each having a file system associated therewith. The volumes each include one or more disks 130. In one embodiment, the physical disks 130 are configured into RAID groups so that some disks store striped data and at least one disk stores separate parity for the data, in accordance with a preferred RAID 4 configuration. However, other configurations (e.g. RAID 5 having distributed parity across stripes) are also contemplated. In this embodiment, a minimum of one parity disk and one data disk is employed. However, a typical implementation may include three data and one parity disk per RAID group, and a multiplicity of RAID groups per volume.

B. Storage Operating System

Again to summarize, the term "storage operating system" as used herein with respect to a filer generally refers to the computer-executable code operable on a storage system that implements file system semantics (such as the above-referenced WAFL) and manages data access. In this sense, Data ONTAP™ software is an example of such a storage operating system implemented as a microkernel. The storage operating system can also be implemented as an application program operating over a general-purpose operating system, such as UNIX® or Windows NT®, or as a general-purpose operating system with configurable functionality, which is configured for storage applications as described herein.

Figure 2:
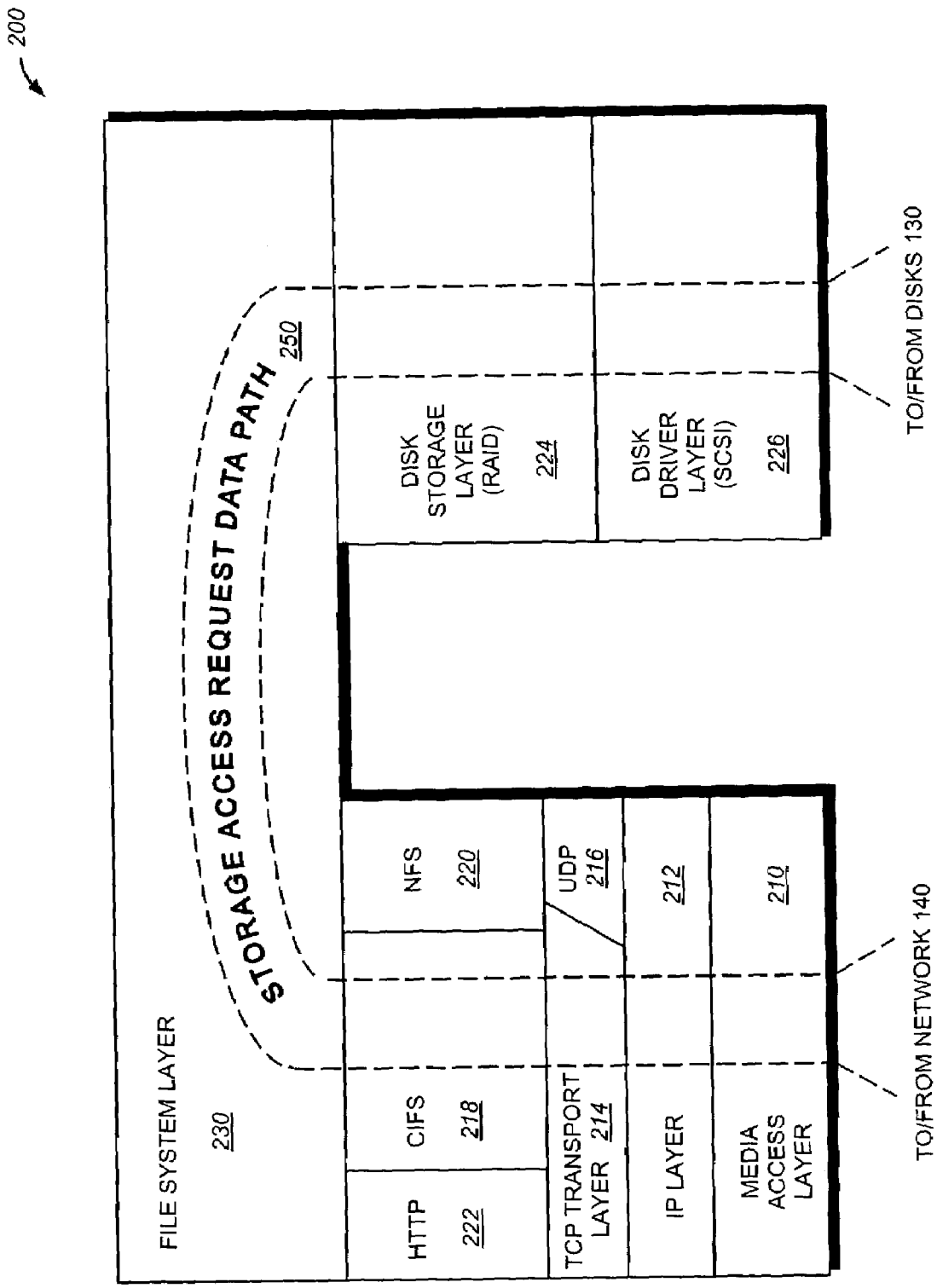
FIG. 2 is a schematic block diagram of an exemplary storage operating system for use with the illustrative file server in FIG. 1.

The organization of a storage operating system for the exemplary filer is now described briefly. However, it is expressly contemplated that the principles of this invention can be implemented using a variety of alternate storage operating system architectures. As shown in FIG. 2, the storage operating system 200 comprises a series of software layers, including a media access layer 210 of network drivers (e.g., an Ethernet driver). The operating system further includes network communication and protocol layers, such as the Internet Protocol (IP) layer 212 and its supporting transport mechanisms, the Transport Control Protocol (TCP) layer 214 and the User Datagram Protocol (UDP) layer 216. A file system protocol layer provides multi-protocol data access and, to that end, includes support for the CIFS protocol 218, the NFS protocol 220 and the Hypertext Transfer Protocol (HTTP) protocol 222. In addition, the storage operating system 200 includes a disk storage layer 224 that implements a disk storage protocol, such as a RAID protocol and a disk driver layer 226 that implements a disk control protocol, such as the small computer system interface (SCSI).

Bridging the disk software layers with the network and file system protocol layers is a file system layer 230 of the storage operating system 200. Generally, the layer 230 implements a file system having an on-disk format representation that is block-based using, e.g., 4-kilobyte (KB) data blocks and using inodes to describe the files. An inode is a data structure used to store information about a file, such as ownership of the file, access permission for the file, size of the file, name of the file, location of the file, etc. In response to file access requests, the file system generates operations to load (retrieve) the requested data from disks 130 if it is not resident "in-core", i.e., in the filer's buffer cache 135. If the information is not in buffer cache, the file system layer 230 indexes into an inode file using an inode number to access an appropriate entry and retrieve a logical volume block number. The file system layer 230 then passes the logical volume block number to the disk storage (RAID) layer 224, which maps that logical number to a disk block number and sends the latter to an appropriate driver (for example, an encapsulation of SCSI implemented on a fibre channel disk interconnection) of the disk driver layer 226. The disk driver accesses the disk block number from disks 130 and loads the requested data in memory 124 for processing by the filer 120. Upon completion of the request, the filer (and storage operating system) returns a reply, e.g., a conventional acknowledgement packet defined by the CIFS specification, to the client 110 over the network 140.

It should be noted that the software "path" 250 through the storage operating system layers described above needed to perform data storage access for the client request received at the filer may alternatively be implemented in hardware or a combination of hardware and software. That is, in an alternate embodiment of the invention, the storage access request path 250 may be implemented as logic circuitry embodied within a field programmable gate array (FPGA) or an application specific integrated circuit (ASIC). This type of hardware implementation increases the performance of the file service provided by filer 120 in response to a file system request packet 150 issued by client 110. Moreover, in another alternate embodiment of the invention, the processing elements of network and storage adapters 126 and 128 may be configured to offload some or all of the packet processing and storage access operations, respectively, from processor 122 to thereby increase the performance of the file service provided by the filer.

C. Mbufs

Referring again to FIG. 1, when a packet of data 150 is received by filer 120 from network 140, the data is transferred from the network adapter 126 to memory 124. More specifically, storage operating system 200 allocates an area in the filer's buffer cache 135 or other suitable computer-readable medium, to store the received data in a data structure called a memory buffer or mbuf.

Figure 3:
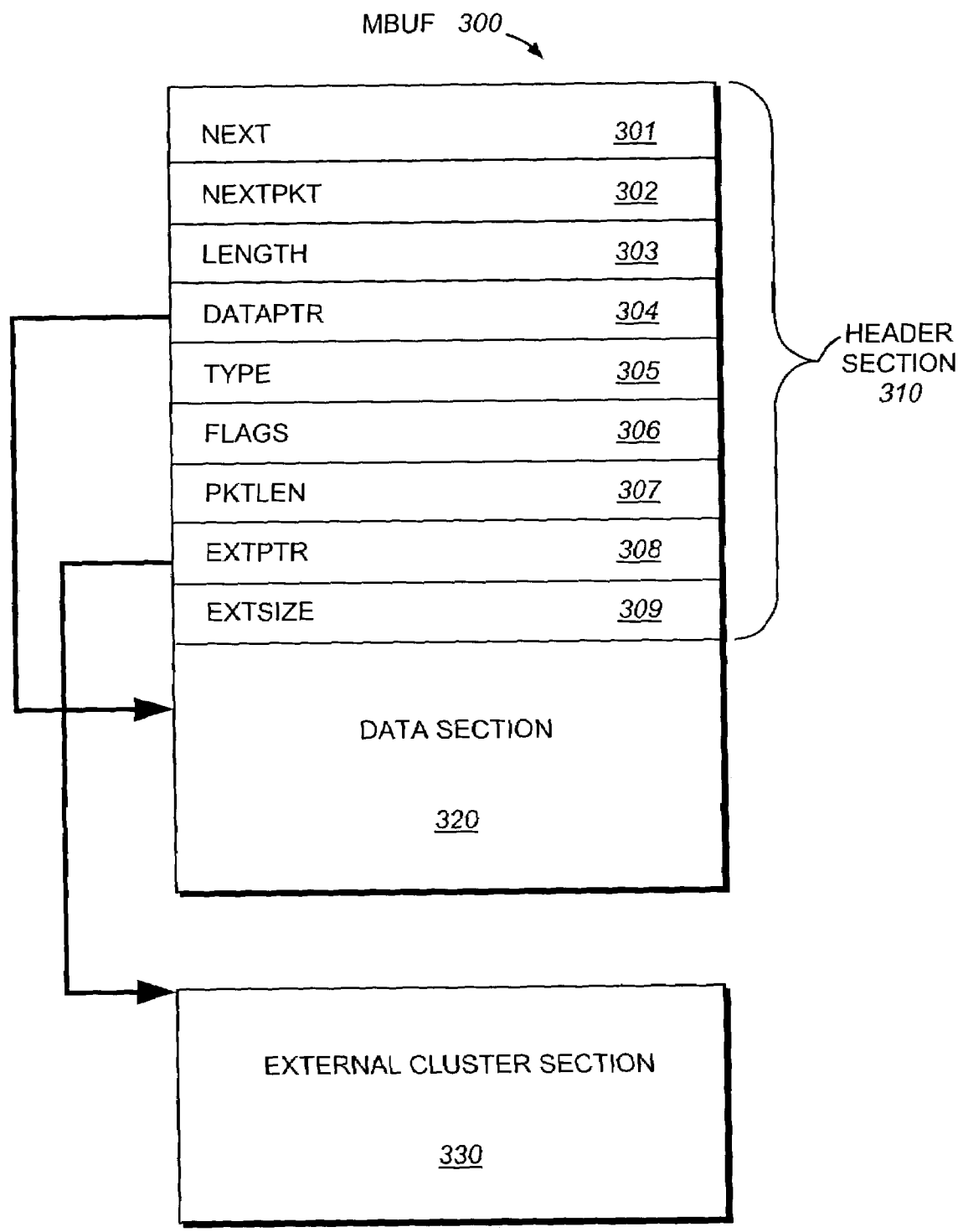
FIG. 3 is a schematic block diagram of an exemplary memory buffer data structure.

In general, mbufs are used to organize received information in a standardized format that can be passed among the different layers of a storage operating system. However, not every storage operating system uses the same mbuf structure. FIG. 3 illustrates a schematic block diagram of one exemplary mbuf, although myriad variations are expressly contemplated. For instance, in mbuf 300, fields could be added or removed from header section 310 or the relative size of header section 310, data section 320 and external cluster section 330 could be varied depending on the resources available to the operating system. Therefore, the mbuf depicted in FIG. 3 is used herein only for explanatory purposes, and the present invention is not limited to its exemplary structure.

FIG. 3 illustrates mbuf 300 comprising header section 310 and data section 320 typically having a fixed combined length, e.g. 128 bytes. Header section 310 comprises a plurality of fields used to describe the contents of the mbuf which may include data (such as a packet) stored in data section 320. The fields in a mbuf can be tailored to specific applications, although one representative set of fields 301–309 is included in mbuf 300. The NEXT field 301 and NEXTPKT field 302 contain pointers to other data structures, such as another mbuf. When data is received in packets, the NEXT pointer usually links mbufs storing data from the same received packet, whereas the NEXTPKT pointer usually links different data packets associated with the same overall data transmission. When data is stored in mbuf 300, the DATAPTR field 304 comprises a pointer to locate the data and LENGTH field 303 keeps track of the amount of data stored. The TYPE field 305 can indicate the type of data stored in the mbuf, e.g. packet header data and/or user data, and the FLAGS field 306 is used to indicate anomalies and special attributes, e.g. the presence of an external cluster section or packet header, associated with the mbuf. When a received data packet spans multiple mbufs, the PKTLEN field 307 can be used to store the overall packet length.

When the data in a received packet is too large to fit in data section 320, the mbuf may use an external cluster section 330 to extend its available storage. The EXTPTR field 308 can store a pointer that references an external cluster and the size of the cluster can be stored in EXTSIZE field 309. Usually, external clusters are a fixed sized, e.g. 1 kilobyte or 2 kilobytes, although EXTPTR could point to clusters of any arbitrary size. Because an external cluster extends the data section of a mbuf, DATAPTR field 304 may point directly to an address in the external cluster section 330 instead of an address in data section 320. Furthermore, an external cluster may be used by more than one mbuf, so DATAPTR pointers from a plurality of mbufs could point to different addresses within the same external cluster.

Figure 4:
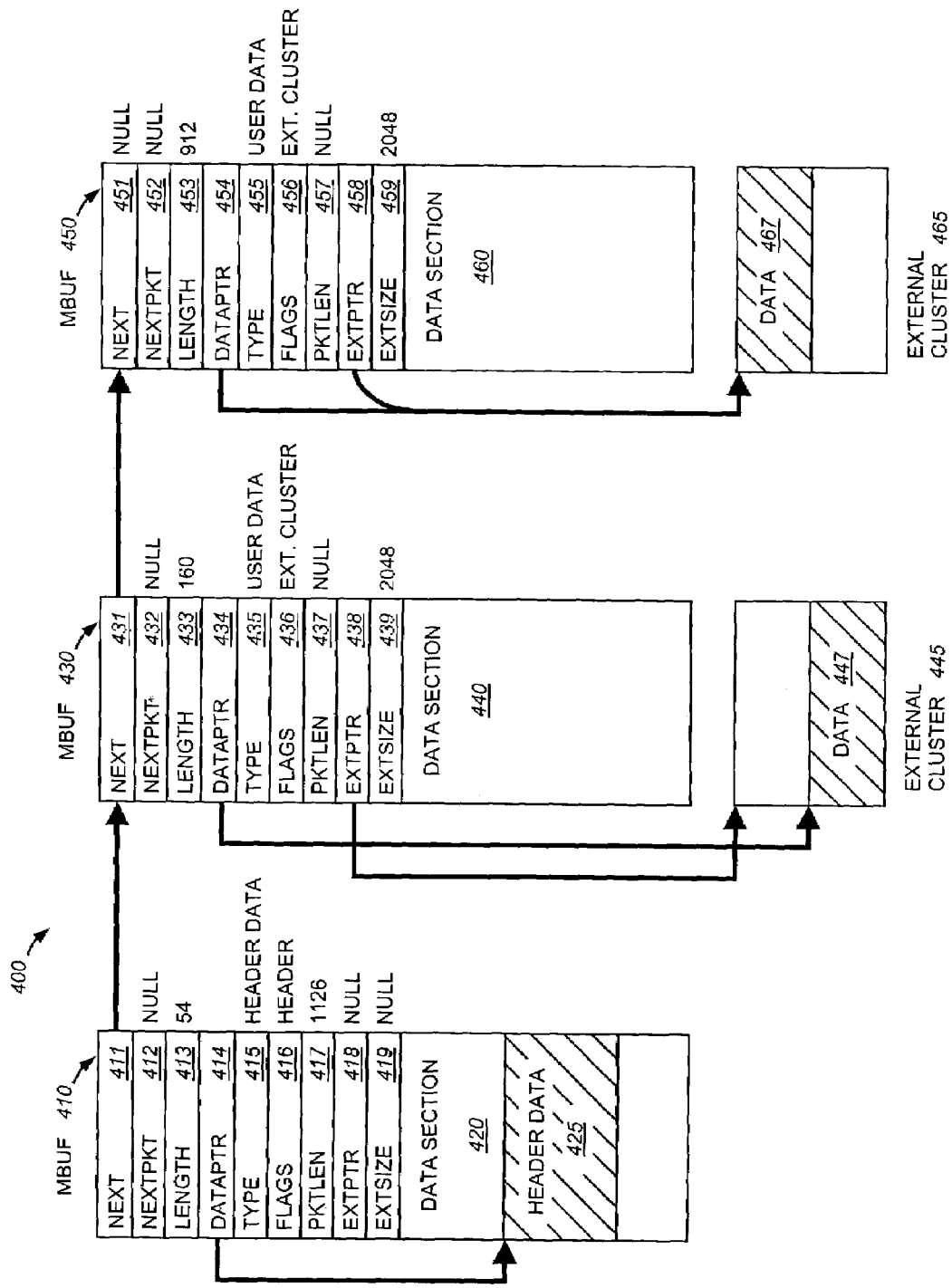
FIG. 4 is a schematic block diagram of an exemplary linked list of memory buffer data structures.

Although FIG. 3 details the structure of one exemplary mbuf, multiple mbufs are typically linked together to form chains of mbufs. That is, a data packet received from a network generally will not fit in a single mbuf and instead is stored in a linked list of mbufs. FIG. 4 illustrates an example of a packet of information 400 ("mbuf chain" 400) stored as a linked list of mbufs 410, 430 and 450. It will be understood to those skilled in the art that the chain of mbufs in FIG. 4 is representative only and any other combination of mbuf types and sizes could also be used to construct a mbuf chain. In FIG. 4, mbuf 410 stores a 54 byte packet header and mbufs 430 and 450 store 160 bytes and 912 bytes of user data respectively. Therefore, the total length of header and user data in the illustrated packet is 1126 bytes.

To form the linked list of mbufs 400, the NEXT fields 411 and 431 point to adjacent mbufs, although NEXT field 451 is set to NULL since it resides in the last mbuf of the chain. The NEXTPKT fields 412, 432 and 454 are all set to NULL since there is only a single data packet. The amount of data in each respective mbuf is stored by LENGTH fields 413, 433 and 453 and the DATAPTR fields 414, 434 and 454 locate their stored data. The PKTLEN field 417 in "leading" mbuf 410 stores the overall length of data packet 400 and subsequent PKTLEN fields 437 and 457 are set to NULL, although each mbuf in the chain could store the overall packet length. The TYPE field 415 and FLAGS field 416 indicate the data in mbuf 410 is header data whereas the TYPE fields 435 and 455 indicate mbufs 430 and 450 store user data.

Packet header data 425 is small enough to fit in data section 420, however user data 447 and 467 are too large to fit in their respective data sections 440 and 460 and require use of external clusters 445 and 465. FLAGS fields 436 and 456 indicate external clusters are being used, and EXTPTR fields 438 and 458 point to the beginning of each external cluster. Each external cluster in FIG. 4 can store up to 2048 bytes as indicated in EXTSIZE fields 439 and 459. In contrast, leading mbuf 410 does not use an external cluster and consequently sets its EXTPTR field 418 and EXTSIZE field 419 to NULL.

Figure 5:
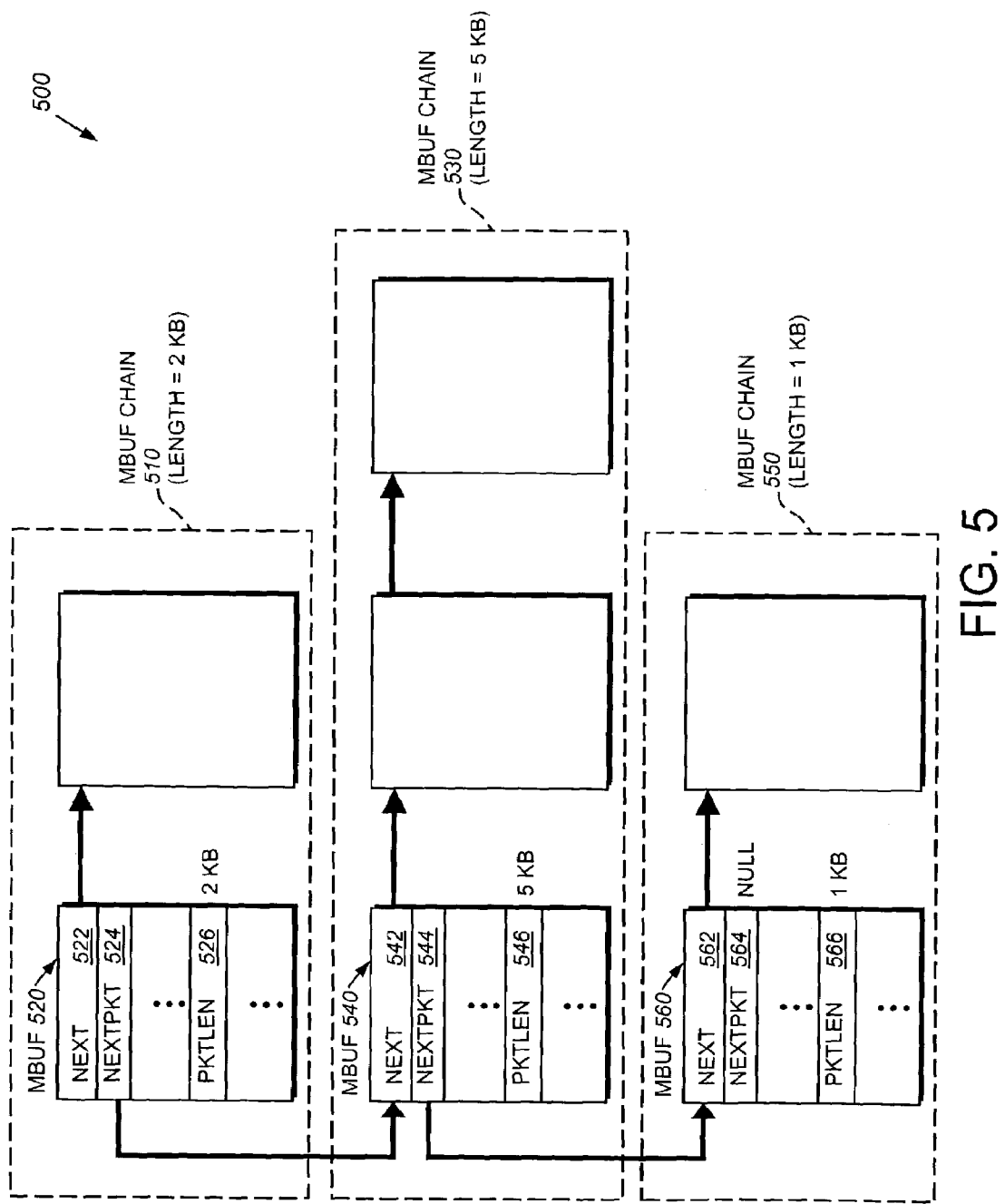
FIG. 5 is a schematic block diagram of an exemplary linked list of linked lists of memory buffer data structures.

Broadly stated, information is usually received by a filer as a plurality of data packets that may be of varying sizes. The filer's storage operating system receives each packet and stores it in a chain of mbufs as shown in FIG. 4. Thus, an overall data transmission typically comprises an ordered sequence of mbuf chains as shown in FIG. 5 where data transmission 500 comprises mbuf chains 510, 530 and 550. Here, a filer receives three data packets having lengths 2 kB, 5 kB and 1 kB and stores them in respective mbuf chains 510, 530 and 550. Although only three received data packets are depicted, it will be understood to those skilled in the art that the data transmission could be composed of any arbitrary number of received data packets of varying lengths. The NEXT fields 522, 542 and 562 point to adjacent memory buffers in their respective mbuf chains and the PKTLEN fields 526, 546 and 566 in leading mbufs 520, 540 and 560 store the amount of data in each mbuf chain. The NEXTPKT fields 524 and 544 link adjacent mbuf chains and NEXTPKT field 564 is set to NULL since it is stored in the last mbuf chain of the transmission.

In summary, when a filer receives data from a network, it allocates memory buffers to store the received data. The memory buffers used to store in-coming data from a network can subsequently be used within the different layers of a storage operating system. Since data is often received from a network in packets of unequal sizes, the filer's storage operating system may have to construct linked lists of memory buffers to store a received data packet. Typically, a plurality of data packets will be associated with a single data transmission, and the operating system can construct linked lists of memory buffer chains to store the overall data transmission.

D. Converting Mbufs to Data Blocks

File systems often organize data in blocks or buffers of a predetermined size and represent files as a sequence of these data blocks. For instance, the Data ONTAP™ storage operating system, available from Network Appliance, Inc. of Sunnyvale, Calif., implements a Write Anywhere File Layout (WAFL™) file system that stores files in 4 kilobyte data blocks. However, when a storage operating system receives a file as a series of packets having various lengths, the file is usually stored in a linked list of mbuf chains, each chain storing one of the data packets. Therefore, data received by a storage operating system typically must be converted from the variable length mbuf chains to fixed block sizes its file system can use.

Figure 6:
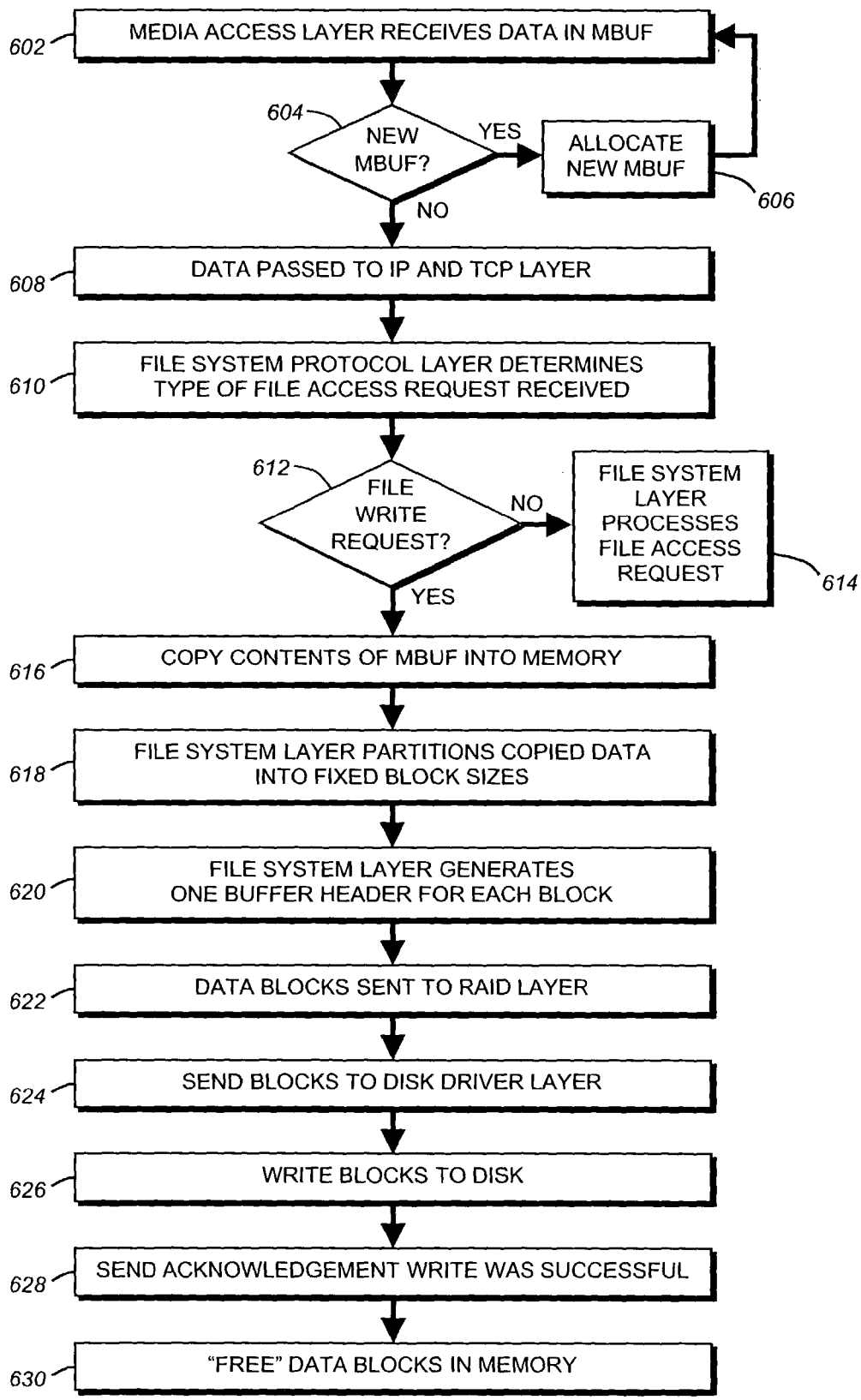
FIG. 6 is a flowchart detailing an exemplary method for a storage operating system to convert variable length data packets to fixed block sizes and write them to disk.

FIG. 6 is a flowchart illustrating an exemplary method for a storage operating system to receive a data file as variable length data packets, partition the received packets into fixed block sizes and write the data blocks to disk. At step 602, data packets are received from a network by the media access layer of a storage operating system. The operating system allocates a mbuf in its memory to store the received data, although more than one mbuf may be required if the received data spans a plurality of data packets. Therefore, at step 604, the operating system decides whether the received data can fit in the mbuf already allocated or whether a new mbuf must be additionally allocated. When a new mbuf is needed, the operating system allocates another mbuf at step 606 in accordance with a conventional memory allocation policy and keeps iteratively adding mbufs until either the received data is completely stored in chains of mbufs or the system runs out of available memory.

Next, at step 608, the data in the mbufs are passed to IP and TCP layers of the storage operating system where network header information is passed ("stripped") from the received data and the resultant mbufs are forwarded to a file system protocol layer. In some implementations, the IP and TCP layers may additionally perform other functions such as data integrity checks and/or cryptographic functions conventionally known in the art. At step 610, the file system protocol layer determines the type of file access request that has been received. In many cases, such as a request to READ or REMOVE a file, the received data does not need to be partitioned into fixed block sizes. However, at step 612, if the file system protocol layer determines a file WRITE request has been received, the storage operating system must apportion the received data into fixed block sizes its file system can manipulate. Step 612 may also check for file access requests besides WRITE requests that require the received data to be partitioned into equal sized segments. If the file access request does not require the data to be partitioned, the file system can process the file access request as normal at step 614.

Steps 616–620 illustrate a method for partitioning the contents of variable length mbuf structures into fixed sized data blocks. At step 616, the received data is copied from mbufs into the filer's memory. Once in memory, the file system partitions the copied data into fixed sized blocks at step 618, and at step 620, generates a buffer header for each of the created data blocks. File systems typically associate a buffer header with each created data block using a one-to-one mapping. Information in a buffer header may include a pointer for locating the data block at a particular location in memory, a block number for identifying the data block from among other blocks at that memory location, a file name associated with data in the data block, and so forth. Because they are generally much smaller in size than their associated data blocks, buffer headers are often passed between layers of the storage operating system instead of their larger data blocks. That is, the operating system layers (e.g., network protocol stack, file system and disk access layers) operate only on the contents of the buffer headers to resolve file access requests.

After the received data has been divided into fixed sized blocks, a RAID layer receives the data blocks, or alternatively receives pointers to the data blocks, at step 622. For RAID implementations that store parity information, such as RAID-4, the RAID layer iteratively performs exclusive-or (XOR) operations on the fixed sized data blocks and associates a computed parity value with each data block. The RAID layer may also assign physical block numbers to each data block. At step 624, a disk driver layer, e.g. SCSI layer, receives information from the RAID layer, such as block numbers and parity data, and uses the information to write the data blocks to disk at step 626.

Next, at step 628, the disk driver layer sends an acknowledgement back to the file system layer when the WRITE is successful. Finally, at step 630, the file system layer can "free" the memory occupied by the data blocks by removing their associated buffer headers from the filer's memory.

Figure 7:
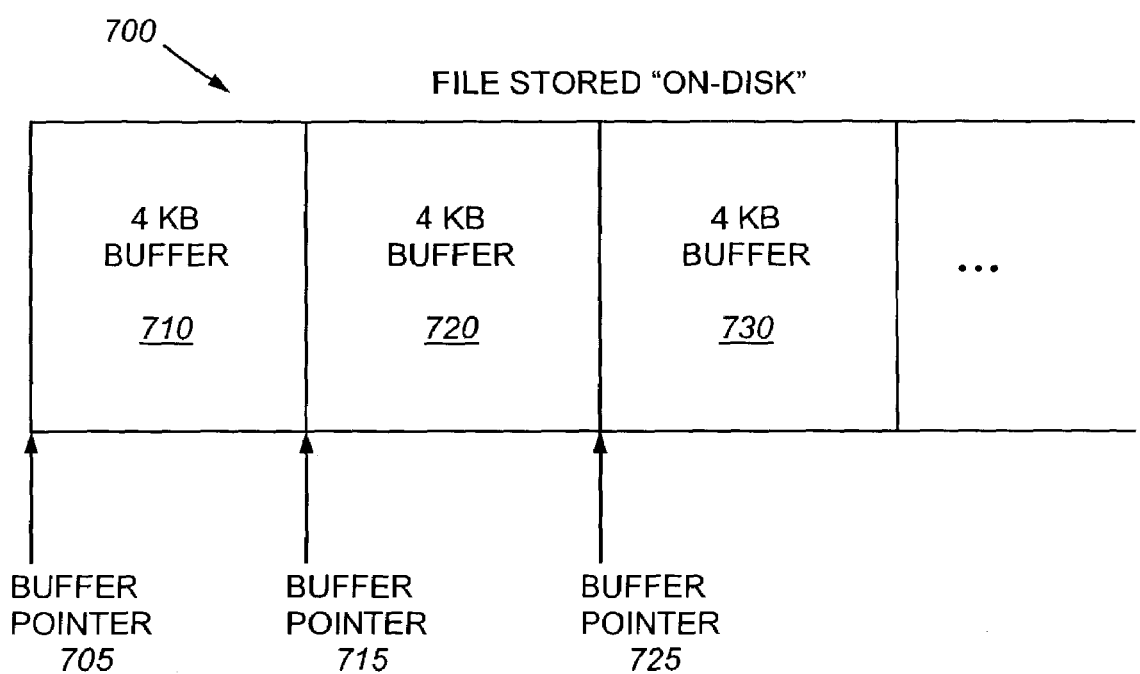
FIG. 7 is a schematic block diagram illustrating a file stored as contiguous buffers of a predetermined size.

FIG. 7 is a representation of a file partitioned according to the method of FIG. 6. File 700 is stored in memory as a sequence of contiguous fixed sized data blocks 710, 720 and 730, each located by its respective buffer pointer 705, 715 and 725. Although the fixed blocks shown are 4 kB in size, the file system could partition file 700 into blocks of an arbitrary predetermined size.

Figure 8:
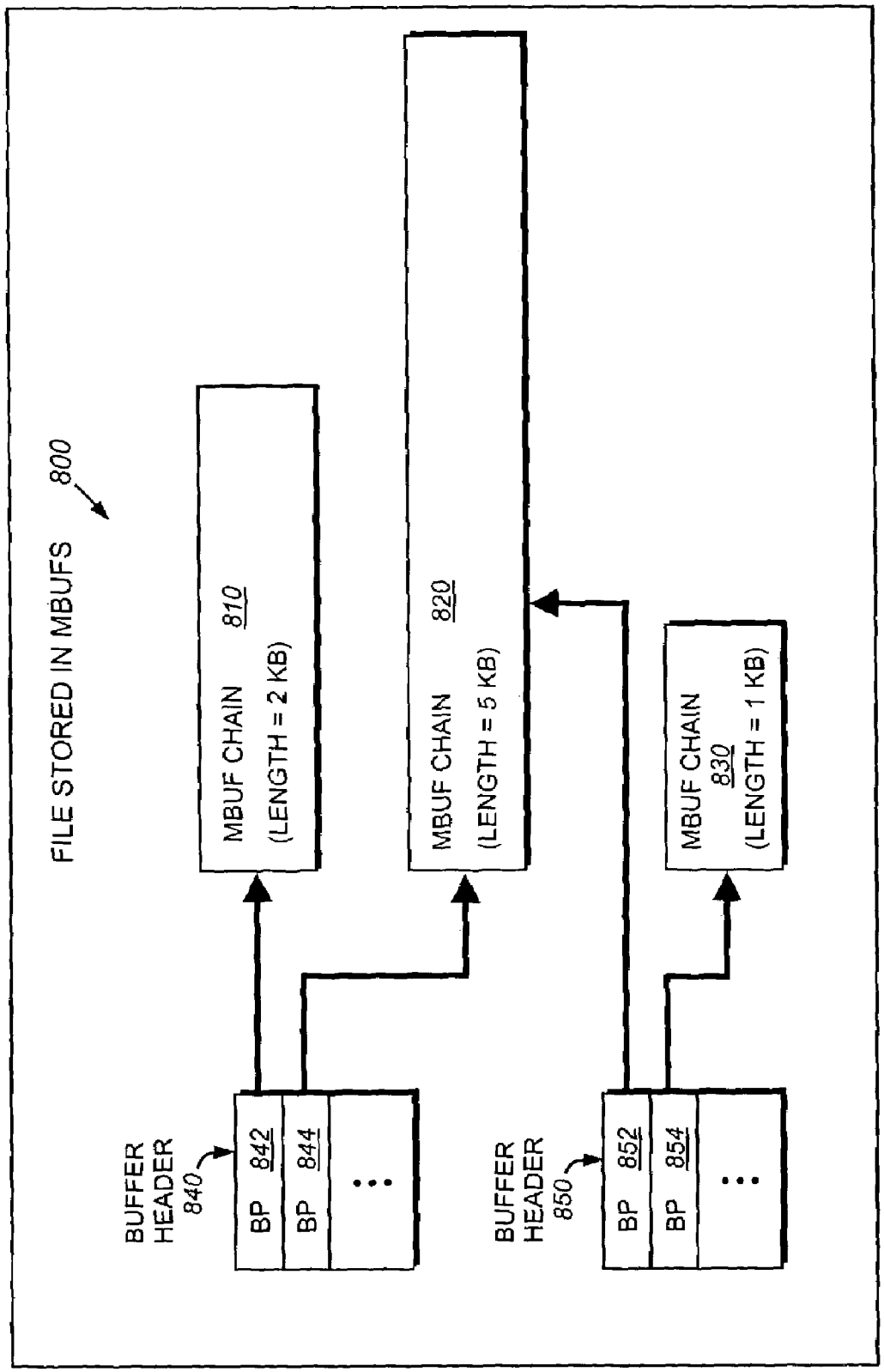
FIG. 8 is a schematic block diagram illustrating a technique that may advantageously be used in accordance with the present invention for partitioning a file stored in memory buffer data structures into data blocks of a predetermined size.

According to one embodiment of the present invention, FIG. 8 is a schematic block diagram illustrating a technique that divides a file stored in variable length mbufs into fixed sized blocks without having to copy the contents of the mbufs into memory. Techniques for partitioning received data into fixed block sizes, such as that in FIG. 6, often rely on copying the contents of mbufs into memory before dividing the data. However, the technique illustrated in FIG. 8 does not require that mbuf contents be copied to memory before being divided into fixed sized blocks.

As shown in FIG. 8, a plurality of mbuf chains 810, 820 and 830, implicitly linked together as in FIG. 5, form overall data transmission 800. For explanatory purposes, an overall transmission of 8 kB is assumed to have been transmitted in three data packets having lengths 2 kB, 5 kB and 1 kB stored in respective mbuf chains 810, 820 and 830. Although only three received data packets are depicted, it will be understood to those skilled in the art that data transmission 800 could be composed of any arbitrary number of received data packets of varying lengths.

If it is assumed the file system manipulates data in 4 kB blocks, the 8 kB data transmission 800 can be partitioned into two fixed sized data blocks having buffer headers 840 and 850. Although the fixed blocks illustrated are assumed to be 4 kB, the file system could partition the received file into blocks of an arbitrary predetermined size. Each buffer header comprises one or more buffer pointers that define a single 4 kilobyte block of data. For example, buffer header 840 is associated with a 4 kB block defined by buffer pointers 842 and 844. Buffer pointer 842 addresses 2 kB of data in mbuf chain 810, and buffer pointer 844 addresses the first 2 kB of data in mbuf chain 820. Buffer header 850 is associated with another 4 kB block of data defined by buffer pointers 852 and 854. Buffer pointer 852 addresses the remaining 3 kB of data in mbuf chain 820 and buffer pointer 854 addresses 1 kB of data stored in mbuf chain 830.

Because each fixed sized data block in FIG. 8 is defined by one or more buffer pointers, there is no one-to-one mapping of data blocks and buffer pointers. Thus, unlike the method outlined in FIG. 6, there is no need to copy the contents of the mbuf chains in order to define a single buffer pointer for every data block. Instead, a storage operating system can manipulate a fixed sized data block using one or more buffer pointers that address data stored directly in one or more mbuf data structures.

Figure 9:
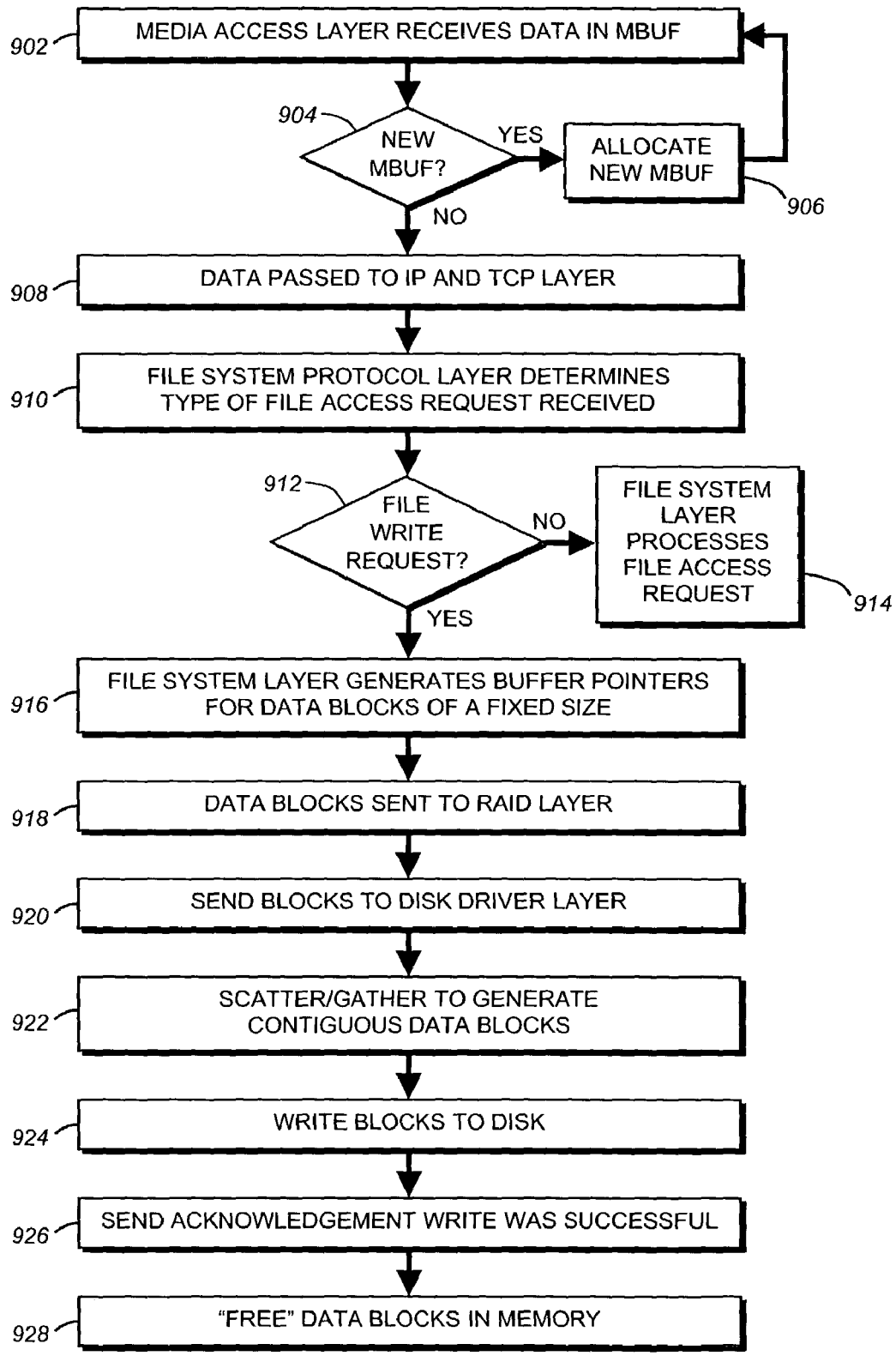
FIG. 9 is a flowchart detailing a method that may advantageously be used in accordance with the present invention for a storage operating system to convert variable length data packets to fixed block sizes and write them to disk.

FIG. 9 is a flowchart detailing an exemplary method of the present invention that improves upon that in FIG. 6 by eliminating the need to copy received data from mbuf data structures before partitioning the data into fixed sized blocks. The illustrated method modifies the write path of the storage operating system to directly handle mbuf data structures while other file access request paths, such as the read path, do not have to be similarly modified. At step 902, data packets are received from a network by the media access layer of a storage operating system. The operating system allocates a mbuf in its memory to store the received data, although more than one mbuf may be required if the received data spans a plurality of data packets. Therefore, at step 904, the operating system decides whether the received data can fit in the mbuf already allocated or whether a new mbuf must be additionally allocated. When a new mbuf is needed, the operating system allocates another mbuf at step 906 and keeps iteratively adding mbufs in accordance with a conventional memory allocation policy until either the received data is completely stored in chains of mbufs or the system runs out of available memory.

Next, at step 908, the IP and TCP layers of the storage operating system strip network header information from the received data and forward the resultant mbufs to a file system protocol layer. In some implementations, the IP and TCP layers may additionally perform other functions such as data integrity checks and/or cryptographic functions conventionally known in the art. At step 910, the file system protocol layer determines the type of file access request that has been received. In many cases, such as a request to READ or REMOVE a file, the received data does not need to be partitioned into fixed block sizes. However, at step 912, if the file system protocol layer determines a file WRITE request has been received, the storage operating system must "divide" the received data into fixed block sizes its file system can manipulate. Similarly, step 912 may also check for file access requests besides WRITE requests that require the received data to be partitioned into equal sized segments. If the file access request does not require the data to be partitioned, the file system can process the file access request as normal at step 914.

The file system layer of the present invention generates one or more buffer pointers that define consecutive fixed sized data blocks at step 916. The one or more generated buffer pointers can address data directly in the mbuf data structures and, according to an aspect of the invention, obviate the need to copy the contents of the mbufs into memory for partitioning purposes. Thus, the file system layer can generate a plurality of buffer headers, each buffer header storing one or more pointers that define a fixed sized data block. In the event a procedure not in the write path, i.e., a file READ request, attempts to access a fixed sized data block of the present invention before it is written to disk, the storage operating system may convert, e.g., via a conventional scatter/gather method, the one or more buffer pointers that define the data block to a contiguous "in-core" data block that may be accessed by the procedure.

Typically, after the received data has been divided into fixed sized blocks as defined by a set of generated buffer headers, a RAID layer receives the data blocks, or alternatively receives the buffer headers that define the data blocks, at step 918. For RAID implementations that store parity information, such as RAID-4, the RAID layer can be modified to use the buffer pointers generated at step 916 to locate consecutive fixed sized data blocks defined by a set of buffer pointers. The RAID layer then performs exclusive-or (XOR) operations on each data block and associates a computed parity value with the data block. The RAID layer may also assign physical block numbers to each data block. At step 920, a disk driver layer, e.g. SCSI layer, receives information from the RAID layer. According to the inventive method, the disk storage layer uses a conventional scatter/gather or equivalent method to convert the set of buffer pointers that address data in one or more mbufs into contiguous fixed sized data blocks at step 922. That is, the disk storage layer performs a translation procedure that conforms, e.g. a larger "address space" in a plurality of mbufs to a smaller address space in a fixed sized data block. At step 924, the disk driver layer uses information from the RAID layer, such as block numbers and parity data, to write the newly formed contiguous data blocks to disk.

Next, at step 926, the disk driver layer sends an acknowledgement back to the file system layer when the WRITE is successful and the file system layer can "free" the memory occupied by the mbuf chains. The mbufs included in the mbuf chains can be designated into a pool of "free" memory buffers in the filer's memory at step 928 once the file system removes all buffer headers that reference their data contents.

E. Pointer Reference Counts

In many cases, operations executable by a filer are restricted by the amount of available memory in the filer, and the filer's storage operating system must recycle blocks of memory no longer in use. The process of recycling memory is often part of a garbage collection procedure that manages memory resources for various layers of the storage operating system. When files are stored as contiguous blocks of a predetermined size (FIG. 7), the operating system can recycle memory by discarding the buffer pointer to each data block and designating the data block as unused. However, when a file is stored in chains of mbufs (FIG. 8), a mbuf chain may store data for more than one buffer header. That is, even though one buffer header no longer uses data in the mbuf chain, another buffer header might still reference that data. Thus, a storage operating system can only recycle (i.e., de-allocate and reallocate) memory buffers in a mbuf chain when there are no buffer headers storing pointers that reference data in the chain.

Figure 10:
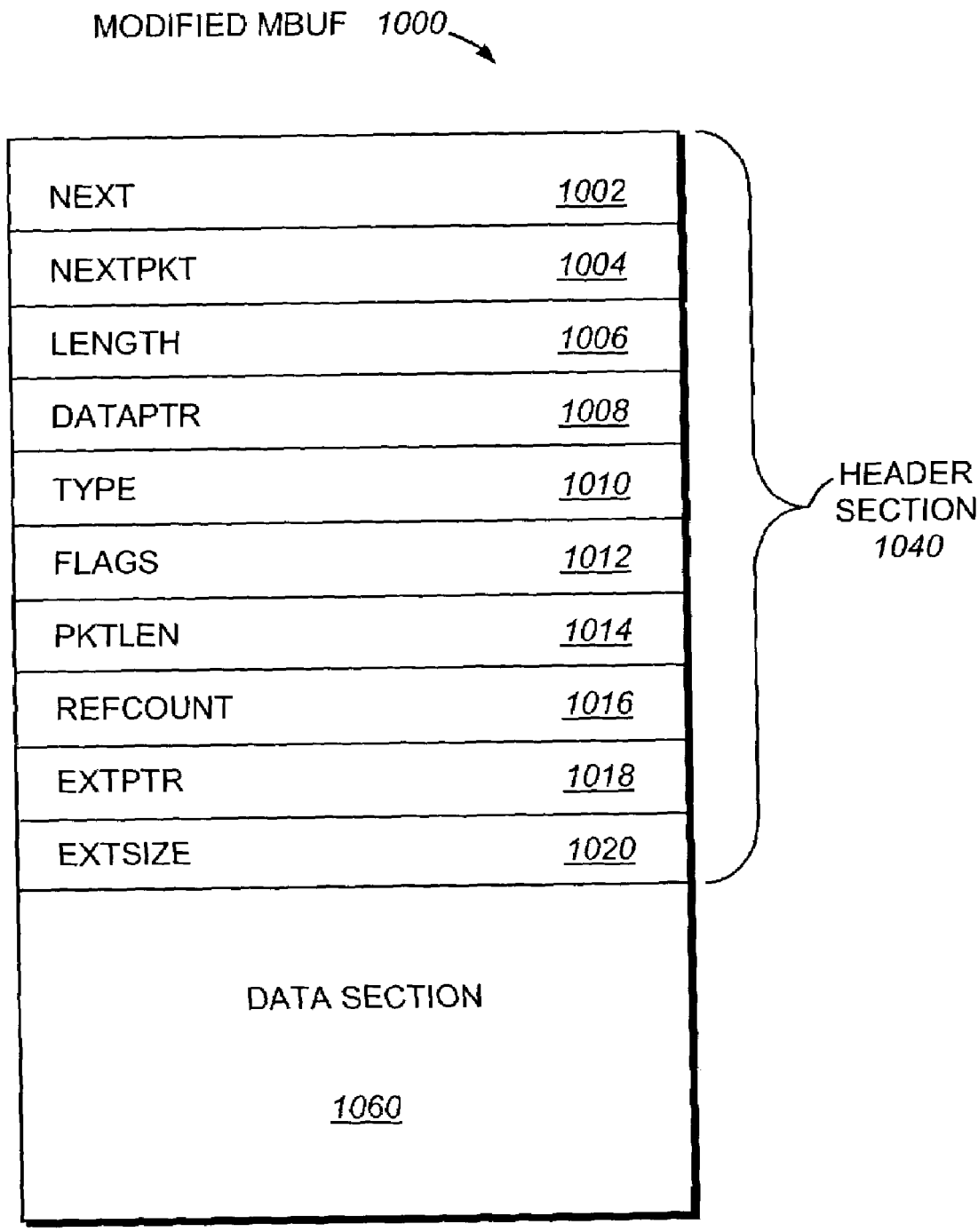
FIG. 10 is a schematic block diagram of a modified memory buffer data structure that may be advantageously used with the present invention.

FIG. 10 is a schematic block diagram of a modified mbuf structure that may be used by a storage operating system to keep track of how many buffer pointers reference data in one or more mbufs. Modified mbuf 1000 comprises a header section 1040 and a data section 1060. Although not explicitly shown, the mbuf may also be associated with an external cluster section having a predetermined size, e.g. 1 or 2 kilobytes. The header section comprises fields 1002–1020. Fields 1002–1014, 1018 and 1020 in the header section serve the same functions as their counterpart fields 301–309 previously enumerated in FIG. 3. However, mbuf 1000 additionally includes a REFCOUNT field 1016 for storing the number of buffer pointers that reference data stored in data section 1060 (or in an associated external cluster section). Alternatively, REFCOUNT field 1016 may indicate the number of buffer pointers that reference data stored in a chain of mbufs that includes mbuf 1000. A storage operating system can increment the REFCOUNT field for a mbuf chain when a new buffer header points to its data and similarly decrement that field when a buffer header no longer references its data. Therefore, when a mbuf's REFCOUNT field is reduced to zero, a storage operating system can de-allocate the mbuf and add it to a list (or "pool") of "free" mbufs that may later be allocated for received network packets.

Figure 11:
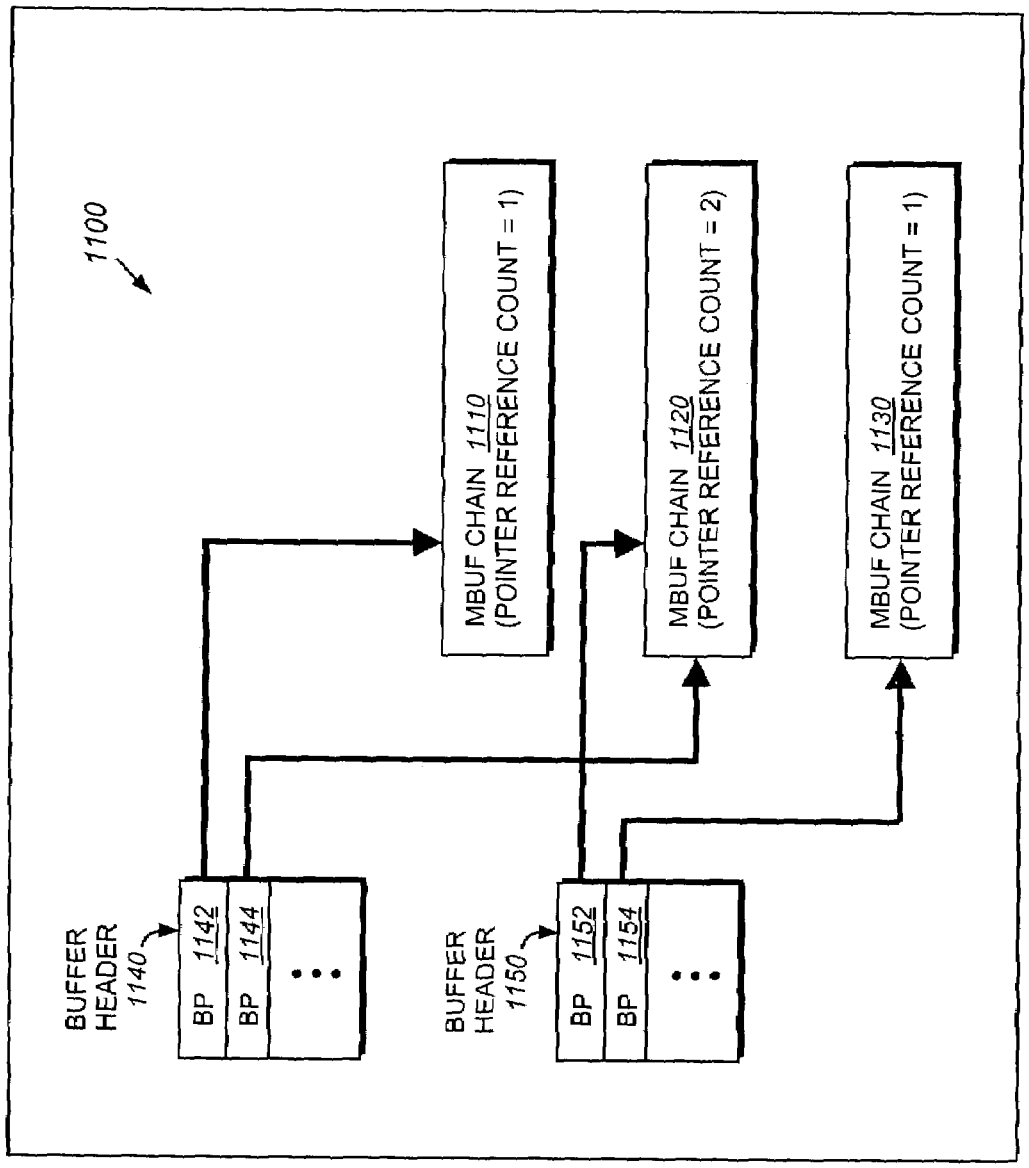
FIG. 11 is a schematic block diagram illustrating an exemplary use of data stored in the modified memory buffer data structure of FIG. 10.

FIG. 11 illustrates "pointer reference counts" for data packets stored in mbuf chains 1110, 1120, and 1130. The pointer reference count represents the number of buffer pointers that reference data in a given mbuf chain and that could be stored in a REFCOUNT field in one or more mbufs of each respective chain. For instance, mbuf chain 1110 has a buffer reference count of one since buffer pointer 1142 in buffer header 1140 is the only pointer that references its data. Similarly, mbuf chain 1130 has a buffer reference count equal to one since only buffer pointer 1154 in buffer header 1150 references its data. However, buffer pointers 1144 and 1152 reference data in mbuf chain 1120, so its buffer reference count is two. As in FIG. 8, it is expressly contemplated that buffer headers in FIG. 11 may be associated with data blocks of any arbitrary size. Further, data transmission 1100 is depicted in three separate mbuf chains only for explanatory purposes, and those skilled in the art would understand the transmission could be any arbitrary length composed of any number of packets.

The foregoing has been a detailed description of an illustrative embodiment of the invention. Various modifications and additions can be made without departing from the spirit and scope of the invention. Additionally, while this description has been written in reference to filers and file servers, the principles are equally pertinent to all types of computers, including those configured for block-based storage systems (such as storage area networks), file-based storage systems (such as network attached storage systems), combinations of both types of storage systems, and other forms of computer systems. Further, it is expressly contemplated that the teachings of this invention can be implemented as software, including a computer-readable medium having program instructions executing on a computer, hardware, firmware, or a combination thereof. Accordingly this description is meant to be taken only by way of example and not to otherwise limit the scope of the invention.

What is claimed is:

1. A method for partitioning data into fixed sized data blocks for storage on a storage device of a storage system having a storage operating system, comprising the following steps:
    (a) storing data received from a network in one or more data structures, the one or more data structures formed into a variable-length chain of data structures;
    (b) generating a set of buffer pointers that define a fixed sized block of the data stored in said variable-length chain of data structures;
    (c) storing said set of buffer pointers in a buffer header associated with the fixed sized block; and
    (d) repeating steps (b)–(c) until all of said received data is partitioned into fixed sized data blocks.

2. The method of claim 1, wherein said set of buffer pointers is generated by addressing portions of said received data stored in one or more of said data structures.

3. The method of claim 1, wherein each generated buffer header stores additional information related to its associated fixed sized data block.

4. The method of claim 3, wherein said additional information includes at least one of a block number for identifying said associated fixed sized data block and a file identification information for identifying the contents of said associated fixed sized data block.

5. The method of claim 1, wherein said received data is received by the storage system.

6. The method of claim 1, wherein said fixed sized data blocks each have a fixed size of 4 kilobytes.

7. The method of claim 1, further comprising the step:
    (f) manipulating said fixed sized data blocks, defined by said generated sets of buffer pointers, in a disk storage layer in the storage operating system.

8. The method of claim 1, further comprising the step:
    (f) using each generated set of buffer pointers in a scatter/gather method to generate contiguous fixed sized data blocks.

9. The method of claim 8, further comprising the step:
    (g) writing said contiguous fixed sized data blocks to a data storage medium.

10. A method for partitioning data into fixed sized data blocks for storage on a storage device of a storage system having a storage operating system, comprising the following steps:
    (a) storing data received from a network in one or more data structures;
    (b) generating a set of buffer pointers that define a fixed sized block of the received data;
    (c) storing said set of buffer pointers in a buffer header associated with the fixed sized block;
    (d) repeating steps (b)–(c) until all of said received data is partitioned into fixed sized data blocks;
    (e) manipulating said fixed sized data blocks, defined by said generated sets of buffer pointers, in a disk storage layer in the storage operating system; and
    (f) calculating at least one parity value in said disk storage layer for each of said fixed sized data blocks defined by said generated sets of buffer pointers.

11. A method for partitioning data into fixed sized data blocks for storage on a storage device of a storage system having a storage operating system, comprising the following steps:
(a) storing data received from a network in one or more data structures;
(b) generating a set of buffer pointers that define a fixed sized block of the received data;
(c) storing said set of buffer pointers in a buffer header associated with the fixed sized block; and
(d) repeating steps (b)–(c) until all of said received data is partitioned into fixed sized data blocks,
wherein each of said data structures stores a pointer reference count that keeps track of the number of said generated buffer pointers that address portions of its stored data.

12. The method of claim 11, wherein the storage operating system recycles a data structure when its pointer reference count is decremented to zero.

13. A storage operating system, comprising:
(a) a first layer that determines a type of file access request associated with data received by the storage operating system, the received data being stored in one or more mbuf data structures, the one or more mbuf data structures formed into a variable-length chain of mbuf data structures;
(b) a second layer that repeats the following steps until all of said received data is partitioned into fixed sized data blocks:
(i) generating a set of buffer pointers that define a fixed sized data block by referencing portions of said received data stored in said variable-length chain of mbuf data structures; and
(ii) storing said set of buffer pointers in a buffer header; and
(c) a third layer that uses each generated set of buffer pointers in a scatter/gather method to generate contiguous fixed sized data blocks.

14. The storage operating system of claim 13, further comprising:
(d) a fourth layer that receives said data from a network and stores said data in said one or more mbuf data structures; and
(e) a fifth layer that strips network headers from said received data.

15. The storage operating system of claim 14, wherein said fourth layer is a media access layer.

16. The storage operating system of claim 14, wherein said fifth layer comprises network communications and protocol layers.

17. The storage operating system of claim 13, wherein said third layer writes said contiguous fixed sized data blocks to a data storage medium.

18. The storage operating system of claim 13, wherein said first layer is a file system protocol layer.

19. The storage operating system of claim 13, wherein said second layer is a file system layer.

20. The storage operating system of claim 13, wherein said third layer is a disk driver layer.

21. A storage operating system of a filer that (i) receives data and an associated file access request from a network, (ii) stores said data in one or more mbuf data structures and (iii) partitions said data into fixed sized data blocks, said storage operating system comprising:
(a) a first layer that determines the type of file access request associated with said received data;
(b) a second layer that repeats the following steps until all of said received data is partitioned into fixed sized data blocks:
(i) generating a set of buffer pointers that define a fixed sized data block by referencing portions of said received data stored in said one or more mbuf data structures; and
(ii) storing said set of buffer pointers in a buffer header; and
(c) a third layer that uses each generated set of buffer pointers in a scatter/gather method to generate contiguous fixed sized data blocks,
wherein a fourth layer calculates at least one parity value for each of said fixed sized data blocks defined by said generated sets of buffer pointers.

22. The storage operating system of claim 21, wherein said sixth layer is a RAID layer.

23. A storage operating system of a filer that (i) receives data and an associated file access request from a network, (ii) stores said data in one or more mbuf data structures and (iii) partitions said data into fixed sized data blocks, said storage operating system comprising:
(a) a first layer that determines the type of file access request associated with said received data;
(b) a second layer that repeats the following steps until all of said received data is partitioned into fixed sized data blocks:
(iii) generating a set of buffer pointers that define a fixed sized data block by referencing portions of said received data stored in said one or more mbuf data structures; and
(iv) storing said set of buffer pointers in a buffer header; and
(c) a third layer that uses each generated set of buffer pointers in a scatter/gather method to generate contiguous fixed sized data blocks,
wherein said storage operating system recycles at least one of said one or more mbuf data structures when none of said generated buffer pointers reference data in said at least one of said one or more mbuf data structures.

24. A memory buffer that receives data sent over a network to an interface of a filer, the memory buffer comprising:
a data section; and
a header section including a field that indicates the number of buffer pointers in a file system layer of a storage operating system that reference data stored in said data section,
wherein the memory buffer is determined to be unused when the buffer pointers reference count equals zero.

25. The memory buffer of claim 24, wherein the field is configured to store a pointer reference count that keeps track of the number of buffer pointers addressing portions of the data stored in the data section.

26. The memory buffer of claim 25, wherein the memory buffer is determined to be unused when the pointer reference count equals zero.

27. An apparatus for partitioning data into fixed sized data blocks for storage on a storage device of a storage system having a storage operating system, the apparatus comprising:
(a) means for storing data received from a network in one or more data structures, the one or more data structures formed into a variable-length chain of data structures;
(b) means for generating a set of buffer pointers that define a fixed sized data block stored in said variable-length chain of data structures;

(c) means for storing said set of buffer pointers in a buffer header associated with the fixed sized data block; and (d) means for repeating steps (b)–(c) until all of said received data is partitioned into fixed sized data blocks.

28. A computer-readable medium having instructions for execution on a processor, said instructions for a method of partitioning data into fixed sized data blocks comprising the following steps:

(a) storing data received from a network in one or more data structures, the one or more data structures formed into a variable-length chain of data structures;

(b) generating a set of buffer pointers that define a fixed sized data block stored in said variable-length chain of data structures;

(c) storing said set of buffer pointers in a buffer header; and (d) repeating steps (b)–(c) until all of said received data is partitioned into fixed sized data blocks each having an associated buffer header.

29. A memory buffer, comprising:

a data section; and a header section configured to store a pointer reference count that keeps track of the number of buffer pointers referencing data stored in a data section, wherein the memory buffer is determined to be unused when the pointer reference count equals zero.

30. A method for partitioning data into fixed sized data blocks in a storage system, the method comprising the steps of:

storing data in one or more data structures, the one or more data structures formed into a variable-length chain of data structures;

generating a set of pointers that collectively define a fixed sized block of the data stored in the variable-length chain of data structures; and processing said fixed sized data block using said set of pointers, without first copying said fixed sized data block into a fixed-sized data buffer.

31. The method of claim 30, further comprising:

storing said set of pointers in a header associated with the fixed sized data block.

32. A method for partitioning data into fixed sized data blocks in a storage system, the method comprising the steps of:

storing data in one or more data structures, each data structure having a first fixed size;

generating a set of pointers that collectively define a fixed sized block of the data stored in the one or more data structures, the fixed sized data block having a second fixed size that is different than the first fixed sized;

and processing said fixed sized data block using said set of pointers, without first copying said fixed sized data block into a fixed-sized data buffer.

33. The method of claim 32, further comprising:

storing said set of pointers in a header associated with the fixed sized data block.

34. A network device, comprising:

a processor;

a network adapter that is adapted to receive data from a network; and a memory that is adapted to store one or more data structures, each data structure being configured to store at least a portion of the data received by the network adapter, the memory being further adapted to store instructions executable by the processor, wherein at least some of the instructions are configured to instruct the processor to perform the steps of:

storing data received by the network adapter into one or more data structures, the one or more data structures formed into a variable-length chain of data structures;

generating a set of pointers that collectively define a fixed sized block of the data stored in the variable-length chain of data structures; and associating a pointer reference count with the variable-length chain of data structures, the pointer reference count keeping track of the number of buffer pointers addressing portions of the data stored in the variable-length chain of data structures.

35. The network device of claim 34, wherein the memory is further adapted to store instructions for performing the step of:

deallocating at least some of the data structures in the variable-length chain of data structures when the pointer reference count associated with the variable-length chain of data structures equals zero.

36. The network device of claim 34, wherein the memory is further adapted to store instructions for performing the step of:

processing said fixed sized data block using said set of pointers, without first copying said fixed sized data block into a fixed-sized data buffer.

37. A computer system configured to partition data into fixed sized data blocks, the computer system comprising:

means for storing data in one or more data structures, the one or more data structures formed into a variable-length chain of data structures;

means for generating a set of pointers that collectively define a fixed sized block of the data stored in the variable-length chain of data structures;

means for processing said fixed sized data block using said set of pointers, without first copying said fixed sized data block into a fixed-sized data buffer.

38. A computer system configured to partition data into fixed sized data blocks, the computer system comprising:

means for storing data in one or more data structures, each data structure having a first fixed size;

means for generating a set of pointers that collectively define a fixed sized block of the data stored in the one or more data structures, the fixed sized data block having a second fixed size that is different than the first fixed size;

and means for processing said fixed sized data block using said set of pointers, without first copying said fixed sized data block into a fixed-sized data buffer.

39. The computer system of claim 38, further comprising:

means for storing said set of pointers in a header associated with the fixed sized data block.

* * * * *

UNITED STATES PATENT AND TRADEMARK OFFICE
CERTIFICATE OF CORRECTION

PATENT NO. : 7,152,069 B1
APPLICATION NO. : 10/271633
DATED : December 19, 2006
INVENTOR(S) : Douglas J. Santry et al.

It is certified that error appears in the above-identified patent and that said Letters Patent is hereby corrected as shown below:

Col. 17, line 24 as shown:

referencing data stored in ~~a~~ said data section, wherein the

Col. 18, line 39 as shown:

variable-length chain of data structures; and

Signed and Sealed this

Tenth Day of August, 2010

David J. Kappos
*Director of the United States Patent and Trademark Office*